July 18, 1967 N. F. BOUNSALL ET AL 3,331,927

SYSTEM FOR EDITING RECORDED MATERIAL UTILIZING HIGH SPEED PASSIVE SWITCHING BETWEEN PLAYBACK AND RECORD MODES

Filed July 20, 1962 2 Sheets-Sheet 1

NORMAN F. BOUNSALL &
DONALD B. MACLEOD
INVENTORS

BY Nathan N. Kallman

ATTORNEY

NORMAN F. BOUNSALL &
DONALD B. MACLEOD
INVENTORS

BY Nathan N. Kallman

ATTORNEY

United States Patent Office 3,331,927
Patented July 18, 1967

3,331,927

SYSTEM FOR EDITING RECORDED MATERIAL UTILIZING HIGH SPEED PASSIVE SWITCHING BETWEEN PLAYBACK AND RECORD MODES

Norman F. Bounsall, Palo Alto, and Donald B. MacLeod, Redwood City, Calif., assignors to Ampex Corporation, Redwood City, Calif., a corporation of California Filed July 20, 1962, Ser. No. 211,363
10 Claims. (Cl. 179—100.2)

Figure 1:
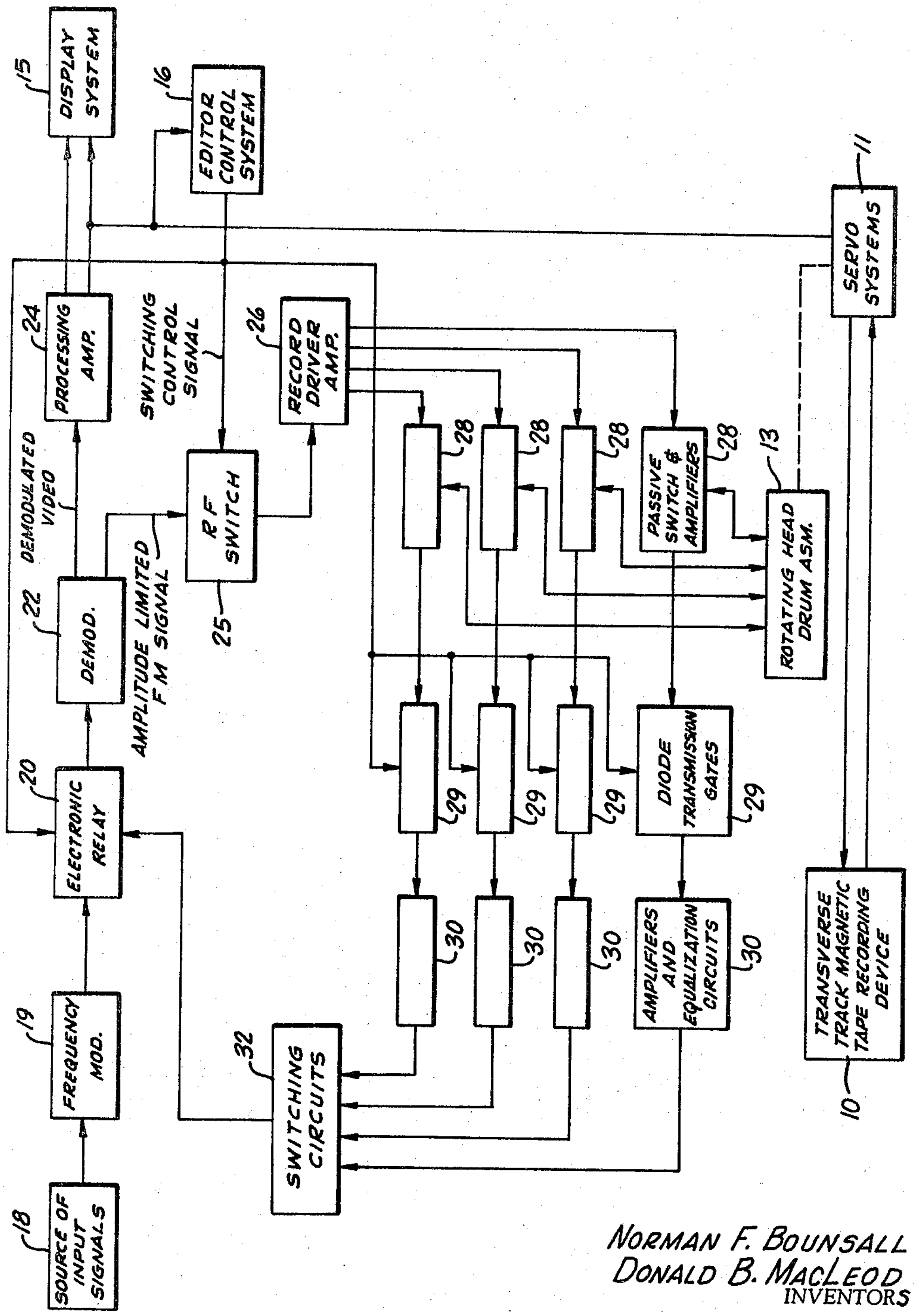

This invention relates to systems for recording and reproducing sequences of information, and particularly to systems for recording, assembling and revising television program material recorded on magnetic tape.

With the advent of high density, wideband recording and reproducing systems, it has become possible to store and play back many different types of signal information. Perhaps the most arresting application, and apparently the most widely used, is the recording and reproduction of television program material. Although the present invention is principally described in this context, it will be appreciated that it has application in other areas as well, such as in the recording of instrumentation data, and that various features provided in accordance with the invention are capable of independent use.

Many problems have been overcome in developing wideband recording and reproducing systems to the point at which television program material can be played back with high fidelity. The band-width required of a television recorder ranges from approximately 10 cycles per second to 4 megacycles per second, and requires an extremely high relative speed between the magnetic tape and the recording and playback heads. The high relative speed must be maintained with a high degree of accuracy, inasmuch as minute physical displacements or variations can result in wide deviations in the reproduced signal and distortion of the television signal.

In a widely adopted form of system for television recording, adequate and continuous compensation is provided for the mechanical and electrical variations that are likely to occur. This system utilizes a multi-transducer head drum that rotates recording and playback heads across a relatively wide magnetic tape, so as to provide successive recorded tracks that are substantially transverse relative to the longitudinal dimension of the tape. Although the longitudinal speed of the tape may be relatively low, the needed high head-to-tape velocity is provided by the rapid angular velocity of the rotating head drum. The system has the inherent flexibility and capacity needed to compensate for variations in drum speed, tape speed, tape stretch and other factors and has proven eminently satisfactory for television recordings.

Modern advertising and editing practices with television program material, however, impose particularly stringent requirements on television recorder systems. Initially, it was deemed not feasible to start and stop the tape so as to substitute one scene for another, assemble different scenes in sequence, or insert material. For this reason, television programs have been prepared in the past by using a number of different cameras and constant editorial control of a continuous performance. When an error occurred under such a procedure, it was necessary to make a mechanical splice by physical steps which were both time consuming and apt to be inexact.

Marked improvements in the program recording capabilities of an individual television recorder have now become possible, with the advent of electronic editing equipments such as those described in copending patent applications entitled, "Control System for Program Recorder," Ser. No. 142,332, now Patent No. 3,084215, and "Editing Systems for Television Recordings," Ser. No.

142,328, now Patent No. 3,180,930, both filed Oct. 2, 1961, and assigned to the assignee of the present invention. These and related systems add a great deal of flexibility to the typical television recording system, inasmuch as they permit intermittent operation of the recording system in such fashion that a continuum of time-separated scenes and sequences may be built up without the introduction of blank spaces or even the loss of synchronization. Such systems operate under the control of cueing, edit and synchronizing signals to transfer between playback and record sources at the precise end of selected television frames. Thus they permit one or a number of frames to be added, or new program material to be assembled with or inserted in place of previously recorded material.

It is now possible, therefore, in accordance with the techniques and systems described in conjunction with above-identified and other applications, to use a single television program recorder to effect a completely electronic splicing together of various program segments. If an error occurs in a given program sequence or scene, a new sequence may be inserted at the appropriate interval. Materials from live sources may be combined with previously recorded material, and sequences of animation may be developed.

A problem is encountered in the use of electronic and mechanical editor systems, however, particularly where a series of closely spaced splices is employed. For television signal recordings with the widely used four-head drum system, the vertical synchronizing interval is referenced to the center of the transverse track in which it is recorded. After identification of vertical sync, the editor control system provides the timing needed to insure that the transition point between record and playback occurs between the track containing vertical sync and the next succeeding track. Similarly, with mechanical splices cuts should be taken in the precise inter-track space.

Even with properly timed transition points, however, a disturbing effect is likely to be introduced in the reproduced picture. The vertical synchronizing interval is not held precisely on center of course, but may vary slightly under servo control, being normally held to several microseconds deviation by servos which are referenced to studio sync. When the transition is made, various causes of error can result in an abrupt shift, relative to the track center, between successive vertical synchronizing intervals. If small, this shift or positional error can be compensated so as to avoid disturbing effects in the reproduced picture. When the positional error is large, however, the top of the raster is displaced to one side, as the correction requires an appreciable time. Large errors introduced if servo control is not exercised substantially continuously during playback until the transition point is reached. Because the playback signal is used for servo purposes, its absence for an interval in excess of a few microseconds results in loss of control and consequent disturbing head drum drift. Such errors are particularly troublesome when a number of relatively short scenes are combined, as in the preparation of an animation sequence.

In the transition from the playback to the record mode it is therefore necessary to switch rapidly between the record and playback circuits associated with the magnetic heads. An electromechanical switching system is too slow acting (requiring 10 milliseconds or more) and in addition is apt to induce large signal transients. An electronic switching system of conventional form is excessively complex for all practical purposes, and even such a switching system introduces an error of several microseconds. It is highly desirable to be able to continue playback until the recording point is reached.

It is therefore an object of the present invention to provide an improved electronic editing system for recorded program material.

Another object of the invention is to provide an electronic editing system that affords splicing of signals recorded on a magnetic tape with a minimum of time base error.

A further object of the present invention is to provide an improved system for editing television program material with a recording and reproducing system having common record and playback heads.

Another object of the present invention is to provide an improved system for providing virtually instantaneous change-over between playback and record modes when effecting electronic splicing of television program material.

In accordance with the invention, high speed switching between playback and record modes at common magnetic heads may be effected through the employment of a passive switching circuit that effectively decouples the playback circuit from the record circuit during the playback mode. In one particular example of a system in accordance with the invention, signals to be recorded and reproduced signals are both provided to a display so that the actually recorded program material may continually be monitored. As determined by control signals that denote selected transition points, signals from an input source are passed through an RF switch to the passive switching circuit that is coupled to the record/playback heads in a transverse track recording system. The record current is coupled immediately to the heads, and simultaneously disconnects the playback circuit, which may be completely decoupled by a transmission gate controlled by the switching control signals.

A particular example of a passive switching circuit, in accordance with the invention, may employ a pair of parallel diodes of opposing polarity coupled in the path between the record driver stage and the record/playback head. The playback preamplifiers may then be coupled directly to the record/playback heads. In the absence of record current the diodes are non-conducting and therefore appear as high impedances, so that only the relatively low level playback signal is presented to the preamplifier. When the record current is applied, however, the diodes are turned on and connect the record amplifiers to the record/playback head.

Figure 2:
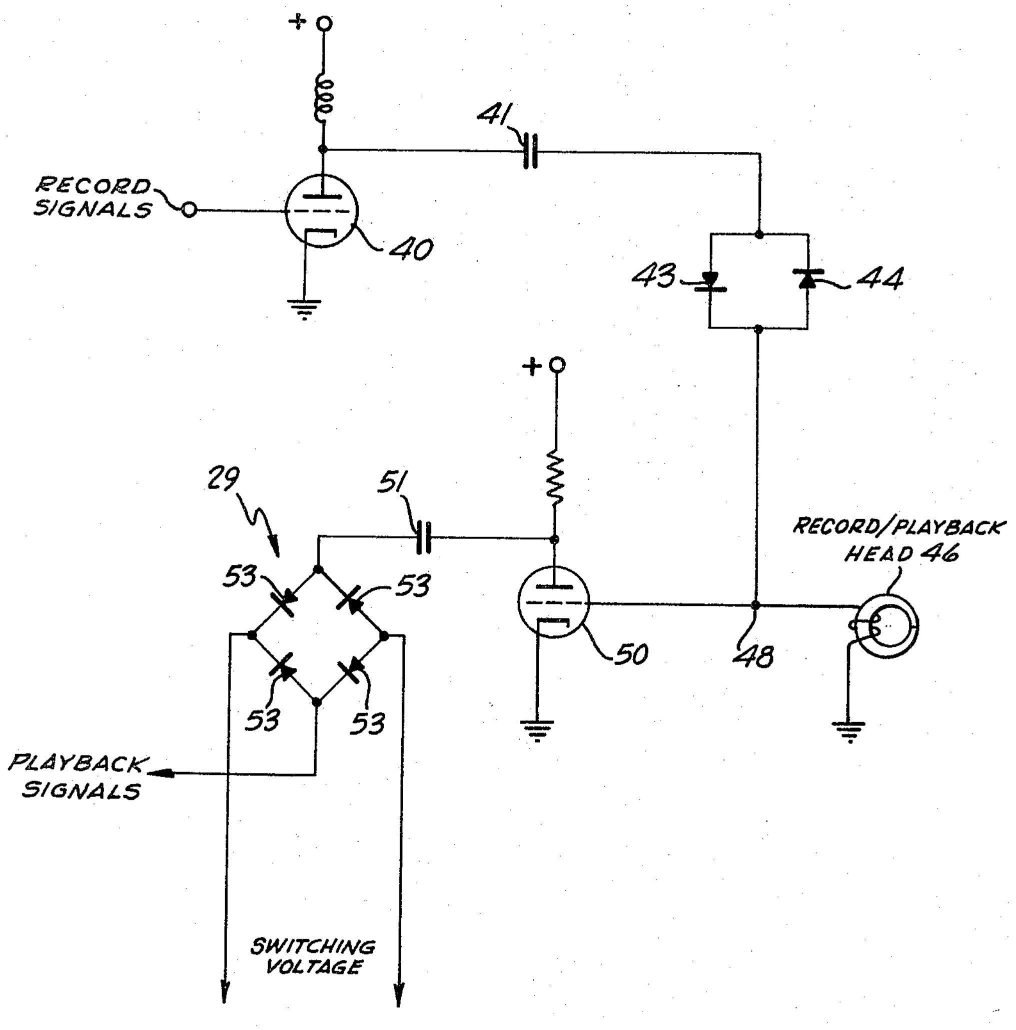

A better understanding of the invention may be had by reference to the following description, taken in conjunction with the accompanying drawings, in which:

FIGURE 1 is a block diagram of an editing system for television program material that is arranged in accordance with the present invention, and FIGURE 2 is a schematic diagram of one example of a passive switching circuit in accordance with the invention.

In the block diagram of FIGURE 1, there is shown a simplified example of a transverse track magnetic tape recording system that is capable of providing electronic editing and splicing functions. The elements and functioning of the transverse track recording system itself are well known in the art, and accordingly are set out herein only in such detail as is needed to describe the invention. For example, the tape, drive reels and capstan mechanism are referred to simply as the transverse track magnetic tape recording device 10, which is controlled by the associated servo systems 11. A multi-transducer rotating head drum assembly 13 cooperates with the recording device 10 to provide recording and playback of the composite television signal, including video and synchronizing signal components. It is assumed that the head drum assembly has four peripherally spaced magnetic transducers that are used for both recording and playback, although other numbers of magnetic transducers may be employed in different modifications of the basic technique.

In a typical studio installation, the system will operate with a visual display system 15, and an editor control system 16, such as described in the previously identified applications. For present purposes, it suffices to note that the editor control system 16 responds to various control signals to generate switching control signals that denote both the mode of operation and the transition points relative to the television program material. By transition point, for television recordings, is meant the point in time between a selected vertical synchronizing pulse interval and the succeeding video information for the frame, this point effecting switchover in the interval between tracks. The editor control system 16 responds to the synchronizing signal components in the composite video signal, the control pulses provided at the selected command of a program editor, and appropriate edit and cueing pulses.

Both during record and playback, signals are provided to the display system 15 so that a program editor or other person may view the material actually recorded on the tape. During the record operation, signals from a source of input signals 18 are provided to a frequency modulator 19 for recording. Through the use of a frequency modulated carrier, it becomes possible to record the desired bandwidth with better response and linearity, because the record head is required to cover fewer octaves and need not have a high frequency bias, among other reasons.

The input signals from the frequency modulator are then provided through an electronic relay circuit 20 to a demodulator 22. The electronic relay 20 may consist of a pair of 6-diode transmission gates which are reversely controlled from the editor control system 16, so that when one of the gates is on the other is off, and vice versa. Thus only signals at one of the two input terminals will be passed to the common output terminal of the electronic relay 20 at a given time. The demodulator 22 operates in conventional fashion to provide demodulated video signals on a given output terminal from the incoming input signals, no matter from what source they are derived. What is here referred to as the demodulator 22 also includes an input limiter circuit. A separate output terminal taken from this input limiter stage is usefully employed in the present system. Amplitude limiting of the signals to be recorded insures greater uniformity and increases the signal to noise ratio.

The demodulated video components are then applied to a processing amplifier circuit 24 for actuating the display system 15. The term "processing amplifier" is here taken to include the sync separator circuits that provide the synchronizing signal components for controlling the editor control system 16.

When operating in the record mode, the switching control signal turns on an RF switch 25 that passes the signals to a record driver amplifier 26 which has separate output couplings for the different record-playback heads. Each of the different output terminals of the record driver amplifier 26 is then coupled to its associated head through a passive switch and amplifier combination 28. Although the last stage of amplifiers may be disposed differently, they are shown in combination with the passive switch circuit because in practice it is convenient to include the last record driver stage and the first preamplifier stage on the same circuit board and in close juxtaposition to the rotating head drum assembly 13. A common connection is then made from each of the passive switch amplifier circuits 28 to the associated head.

Output signals derived at the magnetic head during operation in the playback mode are provided from the passive switch and amplifier circuits 28 to subsequent amplifier and equalization circuits 30 through diode transmission gates 29. The diode transmission gates 29 are also controlled by switching control signals from the editor control system 16. The amplifier and equalization circuits 30 provide the added stages of amplification and any needed compensation for inequality in head response. The signals in the separate channels are then coupled to switching circuits 32 which sequentially combine the contributions from the heads into a single continuous signal that constitutes the equivalent of the originally recorded signal.

The switching circuits 32 are operated in conventional fashion at precisely defined times as determined by the relative position of the successive heads during playback. Output signals from the switching circuits 32 are applied to the remaining input of the electronic relay 20 and are demodulated into the video components that ultimately actuate the display system 15. An example of the passive switch and amplifier circuits 28 and the diode transmission gates 29 for a single channel is shown in FIGURE 2 and is discussed in greater detail below.

Without switching system control as provided in accordance with the present invention, a time base error may be introduced at each electronic splice point. During playback, head drum position at any instant is controlled by the synchronizing pulses on the tape. In normal slow switch-over to a record mode from playback, this control is not exercised and a considerable drift in head drum position may occur. While this drift varies from system to system, the positional error will usually be in excess of $\pm 4$ microseconds, so that an instantaneous eight microsecond error may exist at the splicing points. As a result, recorded synchronizing pulses will vary in periodicity in the region of the splice, and the servo system will be required to undertake an extremely large corrective action.

Systems in accordance with the present invention, however, such as the system of FIGURE 1, provide an extremely rapid change from the playback to the record mode, and reduce the time error at the electronic splice to a fraction of a microsecond, or at the most to an error of about one microsecond. Such time base errors are well within the time correction capabilities of the systems involved, and accordingly disturbing visual effects in the reproduced television picture are avoided.

The magnetic tape recording and reproducing system of FIGURE 1 has this desirable rapid switch-over editing capability because of the combinational use of the relay and switching elements, and the passive switches which concurrently couple each head to both associated record and playback circuits. When it is desired to make the transition from the playback mode, the switching control from the editor control system 16 is actuated in timed relation to the various processes. Thus, as described in the above mentioned applications, the editor control system 16 takes into account the physical displacement of the video erase head relative to the head drum, and also utilizes the vertical synchronizing pulses to control the precise transition point for the video signal (the only signal of concern here). Couplings to and control of the video erase heads, the audio recording heads, and the audio erase heads are not set out in detail here.

At a selected transition point, the switching control signal closes the RF switch 25, providing the high level record current through the record driver amplifier 26 to the various passive switch and amplifier circuits 28 for the separate record-playback heads. Prior to this, during playback, the record driver amplifier 26 and associated circuitry were effectively disconnected from the preamplifier side of the system by unbiased diodes as described below. The high level record current, however, substantially immediately energizes the heads, so that the transition to the record mode is made very rapidly.

The different switching and relay actions are of particular benefit in this combination. The diode transmission gates 29 and the electronic relay 20 both decouple the playback circuit when the record mode is selected. The electronic relay 20, in accepting record signals, simultaneously rejects playback signals. The diode transmission gates 29 are not redundant, however, because they prevent overloading of the playback amplifiers. It should specifically be noted, however, that the diode transmission gates 29 need not be employed in all instances. In practice, it has been found that the amplifiers are not heavily overloaded where the first preamplifier stage 28 is arranged as shown. It is found that grid current is drawn at the first preamplifier stage 28 and that the resultant signal level is not excessive, so that in such cases the gates 29 need not be used.

The immediate switch-over is further controlled by the RF switch 25 which operates in conjunction with the passive switching means 28. A swtching control signal thus operates the electronic relay 20, to accept input signals for recording, and the RF switch 25, for passing the accepted signals as record current.

This system therefore permits the tape to be read virtually continually until the electronic splicing point is reached. Servo control signals, reproduced from the tape continually, control the head drum position to hold the head drum very close to its correct position when the splicing point is reached. Usually the positional tolerance for the vertical synchronizing interval is held in practice within 0.15 microsecond of the correct position. Switching is accomplished so rapidly in accordance with this invention that transitional errors are ordinarily less than a microsecond, which is only a very small proportion of previous errors and well within the quick reaction range of the servo system.

A particularly simple and yet effective arrangement of the passive switch and amplifier circuits 28 and the diode transmission gate 29 in a single channel of the system of FIGURE 1 may be provided by the circuit which is shown in the schematic diagram of FIGURE 2. In this circuit, record signals are provided from the record driver amplifier 26 of FIGURE 1 to a final video amplifier 40 and coupled through a DC blocking capacitor 41 and a pair of oppositely poled, parallel-coupled diodes 43, 44 to the record/playback head 46. Coupling is also made to a common circuit junction 48 which provides input signals for a first preamplifier stage 50 that is coupled by a DC blocking capacitor 51 to a diode transmission gate 29 consisting of a ring of four diodes 53. These diodes 53 are coupled to be forward biased by a switching voltage so as to transmit playback signals to the succeeding amplifier stages 30 whenever the switching voltage is applied. This activation of the gate 29 may be effected by the use of a switching control signal of appropriate polarity, or by the use of an inverter (not shown).

In this arrangement, in the absence of a high level record current, the diodes 43, 44 are non-conducting and appear as high impedances in the circuit. The direct connection of the record/playback head 46 to the first preamplifier stage 50 operates independently of the record driver amplifier and the final video amplifier stage 40. Despite the much higher power levels used in these record circuits, they are effectively decoupled from the playback side and the reproduce operation is normal. Diodes such as the illustrated semiconductor diodes 43 and 44 are of course inherently non-linear impedance devices, because they present high impedances to low level signals and low impedances to high level signals, in accordance with known characteristics. The diode transmission gate 29 is "on" during this interval so that the playback signals are applied to the amplifier and equalization circuits 30 of FIGURE 1 for subsequent switching and processing.

When the record current is turned one, however, the diodes 43, 44 substantially instantaneously conduct to energize the record/playback head 46 for recording without delay. Overload at the first preamplifier stage 50 provides no problem in the playback circuits because of the deactivation of the transmission gate 29.

It will therefore be appreciated that this invention provides an improved switching arrangement for control of the sequencing of recorded program material and particularly for high speed and orderly transitions between playback and record modes, with switching being effected at such high speeds as to avoid the introduction of disturbing effects.

What is claimed is:

1. A system for switching with minimum time interruption between record and playback modes in a magnetic recording and reproducing system, comprising: common record and playback means; means responsive to control signals for providing signals to be recorded; preamplifier means responsive to reproduced signals for providing playback signals to be processed; and passive switching means coupling the means for providing signals to be recorded to the record and playback means, the passive switching means decoupling the preamplifier means from the means for providing signals to be recorded in the absence of high amplitude frequency modulated signals.

2. A system for providing splicing of signals recorded on a magnetic medium in order to minimize the time error that generally occurs at splices comprising: means providing signals to be recorded; common record and playback head means; RF switching means responsive to the signals to be recorded, the RF switching means being responsive to control signals designating transition points; record driver means responsive to the RF switching means; amplifier means for amplifying reproduced signals; and means coupling the record driver means to the common record and playback head means at a common junction point with the amplifier means, the last mentioned means including means for decoupling the amplifier means from the record driver means in the absence of a high amplitude frequency modulated signal.

3. A system for editing program information recorded by a magnetic tape system comprising: means providing signals to be recorded; amplifier means responsive to reproduced signals for providing signals for reproduction; display means responsive to the signals to be recorded and the amplified signals; combined record and playback means associated with the magnetic tape; RF switch means responsive to the signals to be recorded and having a control input; selectively operable editor control means coupled to the control input of the RF switch means to control transition points in the recording of material; record driver means coupled to receive signals from the RF switch means; and passive switching means coupling the record driver means to the record and playback means and coupled at a common junction point to the amplifier means, the passive switching means decoupling the amplifier means from the record driver means in the absence of high amplitude frequency modulated signals.

4. A system for editing and altering the sequence of recorded information on magnetic tape in a magnetic tape system, comprising: editor means providing control signals denoting transition points for the recorded information; switching means controlled by the editor means for providing signals for recording; record driver means responsive to the signals for recording; means for processing signals which are reproduced; common record and playback means; and means coupling the record driver means to the common record and playback means and to the processing means in the presence of high amplitude frequency modulated record signals and decoupling said record driver in the absence of said signals, said last mentioned means including passive switching means controlled by the signal to be recorded.

5. A system for selectively combining television program material from a source with television program material reproduced from a recording and reproducing system, the recording and reproducing system including common record and reproducing means, and the system operating to provide substantially interruption-free transitions between recording and reproducing, the system comprising: means providing control signals to designate transition points between recording and reproducing, means responsive to the control signals and to signals to be recorded for applying driving signals to the recording means; and means responsive to the driving signals for decoupling the means for applying driving signals from the record and reproducing means in the absence of a high amplitude frequency modulated driving signal.

6. An electronic editor system for providing substantially interruption free addition of television recording signals from a source to previously recorded signals on magnetic tape, the magnetic tape being reproduced by a magnetic tape system having common record/playback head means, the system comprising: editor means providing switching control voltages to denote record intervals; modulator means responsive to the input signals to be recorded for providing a frequency modulated carrier signal therefrom; amplifier means responsive to reproduced frequency modulated signals for providing amplified representations thereof; demodulator means responsive to frequency modulated signals for providing demodulated video signals and amplitude limited, frequency modulated carrier signals on separate output terminals; electronic relay means responsive to signals from the modulator means and the amplifier means and controlled by the switching voltage to provide one of the signals to the demodulator means, RF switching means coupled to the demodulator means to receive the frequency modulated carrier signals from said demodulator means and coupled to said editor means and controlled by the switching voltages provided by said editor means; record driver means responsive to signals from the RF switching means and coupled to the record/playback head means; passive switching means including unilateral conducting elements biased by the record current and coupling the record/playback head means to the record driver means in the presence of high amplitude frequency modulated record signals and decoupling said record driver means in the absence of said signals, and display means responsive to the demodulated video signals from the demodulator.

7. The invention as set forth in claim 6 above, wherein the television program material is recorded in transverse tracks on a magnetic tape, and wherein the magnetic tape system includes a magnetic head drum having a number of magnetic heads rotating transversely across the magnetic tape, the record driver means being coupled to each of the magnetic heads, wherein in addition the passive switching means includes a separate passive switch for each of the magnetic heads, and the system includes switching means responsive to the head drum rotation for selectively recombining the reproduced signals into a continuous sequence.

8. A passive switching circuit for a recording and reproducing system which includes an input circuit for providing high amplitude signals to be recorded directly to a transducer element and an output circuit receiving low amplitude signals reproduced by the transducer element, the input circuit and output circuit being coupled to the transducer element at a common junction, the switching circuit comprising: circuit means coupling the input circuit and the output circuit to the common junction, the circuit means including unbiased unilateral conducting elements that present a high impedance to low level signals and a low impedance to high level signals.

9. A passive switching circuit for a recording and reproducing system having an input circuit for providing high amplitude frequency modulated signals to be recorded to a transducer element and an output circuit for receiving low amplitude frequency modulated signals which are reproduced by the transducer element, the circuit comprising: a pair of diodes coupled in parallel and in opposing polarity relation between the input circuit and the transducer element, the transducer element being coupled directly to the output circuit, the diodes being maintained in an unbiased condition, said diodes presenting a high impedance to low level signals to decouple the input circuit from the output circuit in the absence of the high amplitude frequency modulated signals.

10. In an editing system for a magnetic tape recording system in which the relative movement of the recording and reproducing magnetic head with respect to the magnetic tape is controlled during the reproduction of information recorded on the tape by a servo means responsive to separate timing signals recorded on the magnetic tape, a mode switching system comprising: a source of relatively high amplitude signals to be recorded; an input-output terminal on the recording and reproducing magnetic head; a pair of diodes connected in parallel and in opposing relation between the source and said input-output terminal; reproducing amplifier means connected directly to the input-output terminal for receiving the relatively low amplitude signals reproduced by the recording and reproducing head, the pair of diodes being unbiased and presenting a relatively high impedance to the passage of relatively low amplitude reproduced signals and a relatively small impedance to the passage of relatively high amplitude signals, whereby the information and the timing signals recorded on the tape are reproduced by the reproducing amplifier and suitable for control of the servo means, except in the presence of high amplitude signals to be recorded.

References Cited

UNITED STATES PATENTS

| | | | |
|---|---|---|---|
| 2,964,650 | 12/1960 | Radcliffe et al. ---- | 328—171 X |
| 3,090,017 | 5/1963 | Novic ----------- | 328—171 X |

BERNARD KONICK, *Primary Examiner.*

L. G. KURLAND, *Assistant Examiner.*